United States Patent
Karlow et al.

(10) Patent No.: US 10,486,635 B2
(45) Date of Patent: Nov. 26, 2019

(54) REAR SEAT AIRBAG MODULE

(71) Applicant: TK Holdings Inc., Auburn Hills, MI (US)

(72) Inventors: James P. Karlow, Commerce Township, MI (US); Nachiket Pendse, Northville, MI (US); Joseph Fitzgerald, Township, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 207 days.

(21) Appl. No.: 15/483,905

(22) Filed: Apr. 10, 2017

(65) Prior Publication Data
US 2017/0291566 A1 Oct. 12, 2017

Related U.S. Application Data

(60) Provisional application No. 62/319,976, filed on Apr. 8, 2016.

(51) Int. Cl.
*B60R 21/207* (2006.01)
*B60R 21/2338* (2011.01)
(Continued)

(52) U.S. Cl.
CPC .......... *B60R 21/207* (2013.01); *B60R 21/231* (2013.01); *B60R 21/239* (2013.01);
(Continued)

(58) Field of Classification Search
CPC .............. B60R 21/207; B60R 21/2338; B60R 2021/2078; B60R 2021/23153; B60R 2021/23386; B60R 2021/23388
See application file for complete search history.

(56) References Cited

U.S. PATENT DOCUMENTS 2,834,606 A 5/1958 Bertrand
3,617,073 A 11/1971 Landsman
(Continued)

FOREIGN PATENT DOCUMENTS

DE 103 25 124 A1 12/2004
GB 2 362 139 A 11/2001
(Continued)

OTHER PUBLICATIONS

International Search Report dated Jul. 19, 2017 issued in PCT/US2017/026853.
Written Opinion dated Jul. 19, 2017 issued in PCT/US2017/026853.

*Primary Examiner* — Barry Gooden, Jr.
(74) *Attorney, Agent, or Firm* — Gordon Rees Scully Mansukhani, LLP

(57) ABSTRACT

A rear vehicle seat airbag module configured to be mounted to a portion of a seat back of a front vehicle seat comprising an inflator and an inflatable cushion comprising a lower portion, an upper portion and an external tether connecting the lower portion and the upper portion. The inflator provides inflation gas to the inflatable cushion and the inflatable cushion is configured to deploy forward of an occupant seated in a rear seat of a vehicle by curving away from the occupant. The external tether is configured to control a trajectory of the deployment of the inflatable cushion by pulling the upper portion toward the lower portion to curve the inflatable cushion such that the upper portion is located above the lower portion.

19 Claims, 9 Drawing Sheets

(51) Int. Cl.
  *B60R 21/239* (2006.01)
  *B60R 21/261* (2011.01)
  *B60R 21/276* (2006.01)
  *B60R 21/231* (2011.01)
  *B60R 21/00* (2006.01)
  *B60R 21/16* (2006.01)
  *B60R 21/235* (2006.01)

(52) U.S. Cl.
  CPC ........ *B60R 21/2338* (2013.01); *B60R 21/261* (2013.01); *B60R 21/276* (2013.01); *B60R 2021/0004* (2013.01); *B60R 2021/0044* (2013.01); *B60R 2021/0048* (2013.01); *B60R 2021/0051* (2013.01); *B60R 2021/0055* (2013.01); *B60R 2021/161* (2013.01); *B60R 2021/23153* (2013.01); *B60R 2021/23169* (2013.01); *B60R 2021/23382* (2013.01); *B60R 2021/23386* (2013.01); *B60R 2021/23509* (2013.01); *B60R 2021/23576* (2013.01); *B60R 2021/2612* (2013.01)

(56) References Cited

U.S. PATENT DOCUMENTS

| | | |
|---|---|---|
| 3,791,667 A | 2/1974 | Haviland |
| 4,290,627 A | 9/1981 | Cumming et al. |
| 5,395,134 A * | 3/1995 | Gunn .................. B60R 21/2342 280/743.1 |
| 5,743,554 A | 4/1998 | Friedrich et al. |
| 5,782,488 A * | 7/1998 | Lewis .................. B60R 21/231 280/728.2 |
| 5,945,184 A * | 8/1999 | Nagata .................. B60R 21/233 280/728.1 |
| 5,975,565 A * | 11/1999 | Cuevas .................. B60N 2/433 280/728.2 |
| 8,662,417 B2 | 3/2014 | Pero |
| 8,851,511 B1 * | 10/2014 | Volkmann ......... B60R 21/23138 280/730.2 |
| 9,308,883 B1 | 4/2016 | Schneider |
| 9,446,733 B2 | 9/2016 | Pausch et al. |
| 9,896,056 B2 * | 2/2018 | Burczyk .............. B60R 21/231 |
| 2004/0174003 A1 | 9/2004 | Dominissini |
| 2005/0029779 A1 * | 2/2005 | Bito .................... B60R 21/205 280/728.2 |
| 2006/0214405 A1 * | 9/2006 | Rose .................... B60R 21/201 280/743.1 |
| 2007/0296186 A1 | 12/2007 | Kwon |
| 2010/0156074 A1 * | 6/2010 | Kubo .................... B60R 21/231 280/737 |
| 2010/0156076 A1 * | 6/2010 | Miyata .................. B60R 21/233 280/743.1 |
| 2011/0001307 A1 | 1/2011 | Mendez |
| 2011/0049846 A1 | 3/2011 | Hirth et al. |
| 2012/0049492 A1 | 3/2012 | Choi et al. |
| 2012/0133114 A1 | 5/2012 | Choi et al. |
| 2012/0193896 A1 | 8/2012 | Turnbull et al. |
| 2013/0168949 A1 | 7/2013 | Tanaka et al. |
| 2014/0008902 A1 | 1/2014 | Schneider et al. |
| 2014/0030455 A1 * | 1/2014 | Ruschulte .............. B25J 9/1075 428/35.2 |
| 2014/0151984 A1 * | 6/2014 | Fukawatase .......... B60R 21/233 280/730.2 |
| 2016/0046254 A1 | 2/2016 | Yamada et al. |
| 2016/0059815 A1 * | 3/2016 | Jung .................... B60R 21/206 280/730.1 |
| 2016/0082916 A1 * | 3/2016 | Miura .................... B60R 21/239 280/728.3 |
| 2016/0144818 A1 * | 5/2016 | Mihm .................... B60R 21/231 280/730.2 |
| 2016/0200278 A1 * | 7/2016 | Wiik ................ B60R 21/23138 280/729 |
| 2017/0129446 A1 * | 5/2017 | Kobayashi ............ B60R 21/207 |
| 2017/0174172 A1 | 6/2017 | Burczyk et al. |
| 2017/0291566 A1 * | 10/2017 | Karlow ................ B60R 21/276 |
| 2017/0334386 A1 * | 11/2017 | Park .................. B60R 21/2338 |
| 2018/0043852 A1 | 2/2018 | Fischer et al. |
| 2019/0061668 A1 * | 2/2019 | Zhang .................. B60R 21/207 |
| 2019/0161048 A1 * | 5/2019 | Thomas ................ B60R 21/216 |

FOREIGN PATENT DOCUMENTS

| | | |
|---|---|---|
| JP | 2012-101588 | 5/2012 |
| JP | 2015-522482 | 8/2015 |
| WO | WO 2007/060515 A1 | 5/2007 |
| WO | WO 2008/030144 A1 | 3/2008 |
| WO | WO 2008/095615 A1 | 8/2008 |
| WO | WO 2010/036162 A1 | 4/2010 |
| WO | WO 2014/016432 A1 | 1/2014 |
| WO | WO 2015/120970 A1 | 8/2015 |

* cited by examiner

REAR SEAT AIRBAG MODULE

CROSS REFERENCE TO RELATED APPLICATIONS

This application claims priority to and the benefit of U.S. Provisional Application No. 62/319,976 filed on Apr. 8, 2016 which is incorporated herein by reference in its entirety.

BACKGROUND

The application relates generally to airbag modules and, in particular, to an airbag module containing an inflatable airbag cushion configured to deploy forward of an occupant seated in a rear seat of a vehicle (e.g., $2^{nd}$ or $3^{rd}$ row of a vehicle).

The rear seat airbag module described herein includes an inflatable airbag cushion that provides support to an occupant seated in the rear seat of the vehicle and absorbs collision forces to absorb energy of the occupant in the event of a frontal or near frontal crash of the vehicle.

BRIEF DESCRIPTION OF THE DRAWINGS

The features, aspects, and advantages of the present invention will become apparent from the following description, and the accompanying exemplary embodiments shown in the drawings, which are briefly described below.

DETAILED DESCRIPTION

As shown in the figures, the rear seat airbag module may include an inflatable cushion that includes a simple inflatable structure including a lower portion, an upper portion, and two optional support tethers respectively connected between the lower portion and the upper portion to support the occupant and absorb collision energy. The airbag module may be mounted to a lower portion, a middle portion or an upper portion of a seatback of a front seat of the vehicle.

When the inflator is initiated and deploys the inflatable cushion, the inflatable cushion deploys into a position such that the upper portion is located above the lower portion to provide support for the occupant and an energy absorbing function. The inflatable cushion is configured to vent through the upper portion to an exterior of the inflatable cushion for metered gas flow for energy absorption. The airbag module and deploying inflatable cushion do not require additional mechanical attachments to upper regions of the rear of the front seat or to any other structure in the car body.

The airbag module described herein provides a unique rear seat frontal crash protection inflatable cushion using a combination of geometry, mounting, tethering and venting to support the occupant and absorb collision energy.

Figure 1:
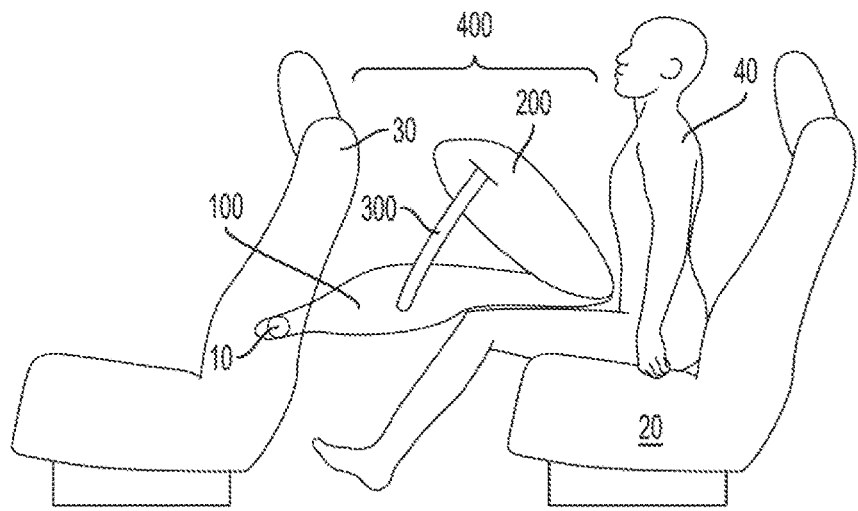
FIG. 1 is a side view of a rear seat airbag module.

FIG. 1 is a side view of an embodiment of the rear seat airbag module. The airbag module includes an inflator 10 and an inflatable cushion 400 that includes a lower portion 100 and an upper portion 200. The lower portion 100 and the upper portion 200 may be connected by at least one external tether 300.

In a deployment, the same sensor system that would deploy an inflatable airbag cushion for an occupant seated in a front seat of a vehicle will also be used for controlling the rear seat airbag module. The rear inflatable cushion 400 would deploy into a position to protect the rear occupant 40 of the vehicle.

The rear seat airbag module may be may be mounted to a lower portion, a middle portion or an upper portion of a seatback 30 of a front seat of the vehicle. The airbag module includes a housing containing the folded inflatable cushion 400 and a cushion inflation device (i.e., an inflator 10) that produces gas to fill the inflatable cushion 400. The inflator 10 receives a deployment electrical signal and, in response to the signal, is triggered or initiated and releases gas into the folded inflatable cushion 400. The gas flows into the lower portion 100 of the inflatable cushion 400.

Figure 2:
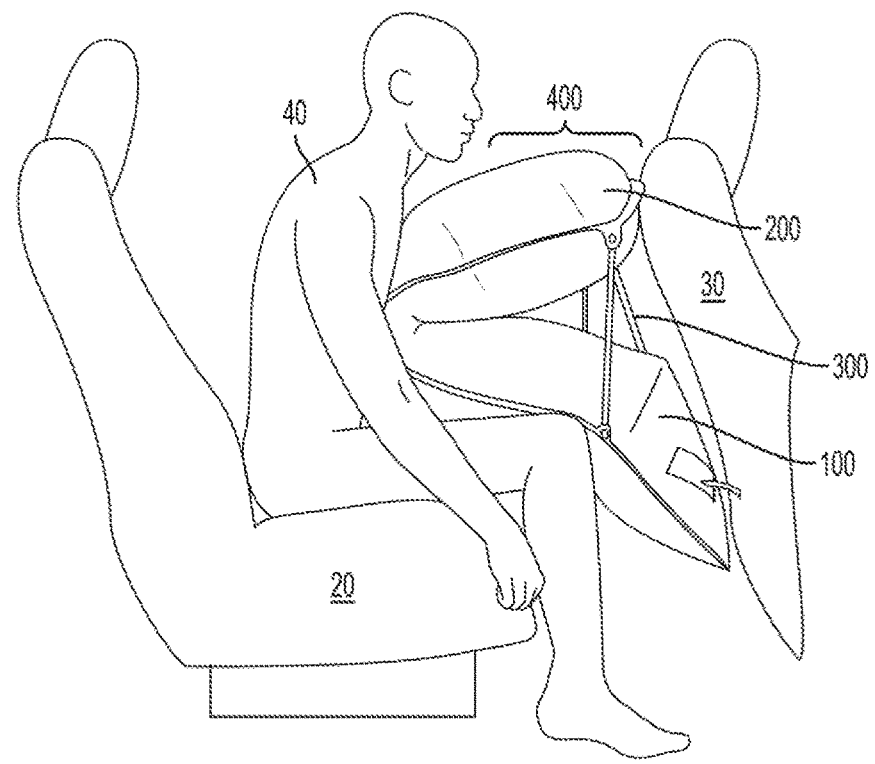
FIG. 2 is a side view of the rear seat airbag module showing an interaction between the deployed inflatable airbag cushion and an occupant seated in a rear seat of a vehicle.

FIG. 2 is a side view of the rear seat airbag module showing the interaction between the deployed inflatable cushion 400 and an occupant 40 seated in a rear seat 20 of the vehicle. As mentioned above, when the inflator 10 is initiated and deploys the inflatable cushion 400, the inflatable cushion 400 deploys into a position such that the upper portion 200 is located above the lower portion 100 to provide support for the occupant 40 and an energy absorbing function.

The lower portion 100 and the upper portion 200 are connected end to end and tethers 300 externally connected between the lower portion 100 and the upper portion 200 restrain the lower portion 100 and the upper portion 200 relative to each other. The inflatable cushion 400 may be projected from a lower portion, a middle portion or an upper portion of the seatback 30 with inflation of the lower portion 100 directing the deploying inflatable cushion 400 above the knees and toward the pelvic region of the occupant 40.

As the lower portion 100 inflates, the upper portion 200 begins to inflate as inflation gas flows through a passage located at the interface of the lower portion 100 and the upper portion 200. The passage is formed by the mated fabric panels to be a necked down or restricted flow area. The passage can be closed by a valve or flow restrictor device. For example, as described further below, the valve could restrict return flow from the upper portion 200 to the lower portion 100 when the lower portion 100 and the upper portion 200 are impacted by the occupant 40.

As the upper portion 200 is inflated, the trajectory of the inflatable cushion 400 is constrained by tethers 300 externally attached between the upper portion 200 and the lower portion 100 causing the upper portion 200 to fold back on the lower portion 100 as it inflates. The inflated cushion 400 interacts with the occupant 40 in the area of the pelvis and the knees. The knees are supported by the lower portion 100 against the lower portion of the front seatback 30 while a far end of the lower portion 100 supports the pelvis to hold it in positon.

The configuration of the inflatable cushion 400 causes the interacting occupant 40 to pivot at the pelvis with the upper torso, neck and head bending forward. As the upper torso of the occupant 40 pivots forward, the torso interacts with the upper portion 200 which is located between the occupant facing end of the lower portion 100 and the upper portion of the front seatback 30.

As mentioned above, the upper portion may be held in position with external tethers 300 connecting the lower portion 100 and the upper portion 200. Energy of the upper torso is dissipated by the compression of the upper portion 200, now above the inflated lower portion 100 and subsequent venting of the compressed gas through a single or plurality of vent holes in the upper portion 200, while both the lower portion 100 and the upper portion 200 continue to support the occupant 40. The occupant energy is absorbed and support is maintained until the gas is substantially exhausted from the vent holes.

Figure 3:
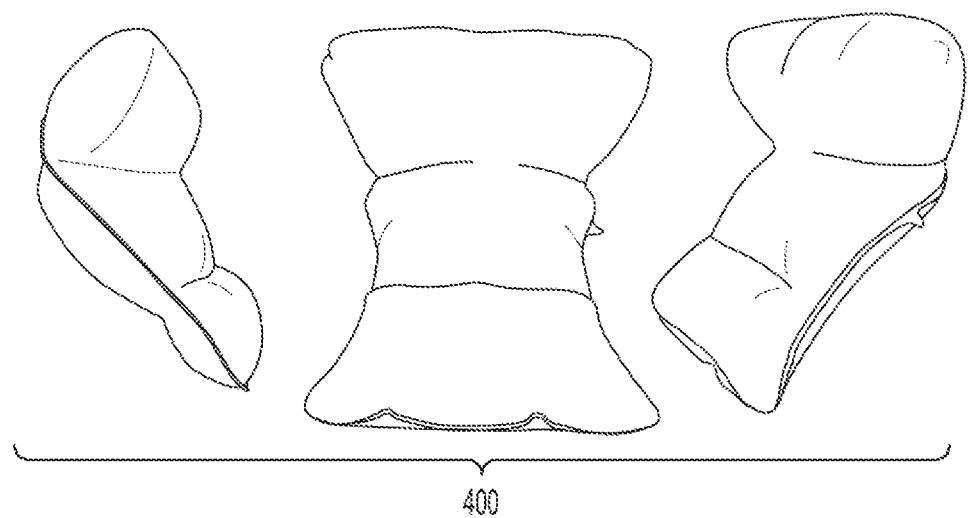
FIG. 3 illustrates three different views of an inflated airbag cushion.

FIG. 3 illustrates three different views of the inflated cushion 400. The inflated cushion 400 includes a seam in the lower portion 100 where an internal tether (not shown) is connected to the fabric panels forming the inflatable cushion 400. During deployment the inflatable cushion 400 moves upwardly over the knees and into the pelvic region of the occupant 40. The upper portion of the inflatable cushion 400 may include a larger volume for absorbing energy and cushioning the occupant 40 than the lower portion 100.

Figure 4:
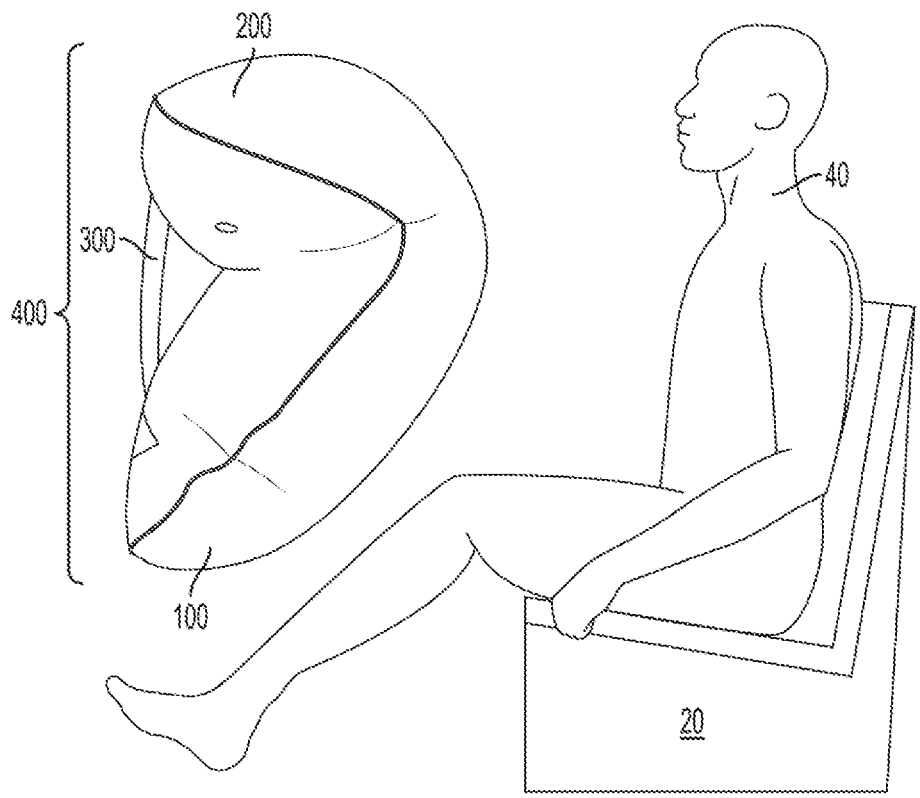
FIG. 4 is a side view of the deployed inflatable airbag cushion showing a single centrally located external tether controlling the deployment position of the inflatable airbag cushion.

FIG. 4 is a side view of the deployed inflatable cushion 400 showing a single centrally located external tether 300 controlling the deployment position of the inflatable cushion 400.

Figure 5:
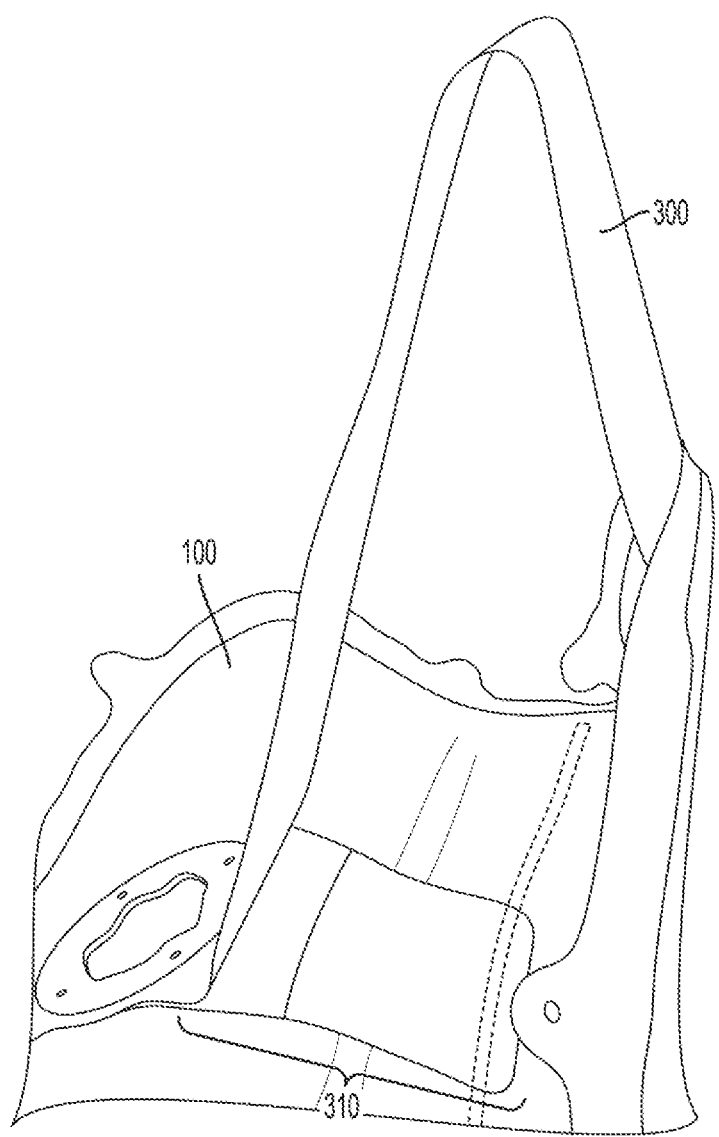
FIG. 5 shows the external tethers used in the inflatable airbag cushion of FIG. 4.

FIG. 5 illustrates an external tether 300 used in the inflatable cushion 400 of FIG. 4. The elongated centrally located tether 300 spans between the lower portion 100 and the upper portion 200. In addition, a breakable tether 310 is connected between the inflator opening and a cross-seam that secures the internal tether in the lower portion 100.

Figure 6:
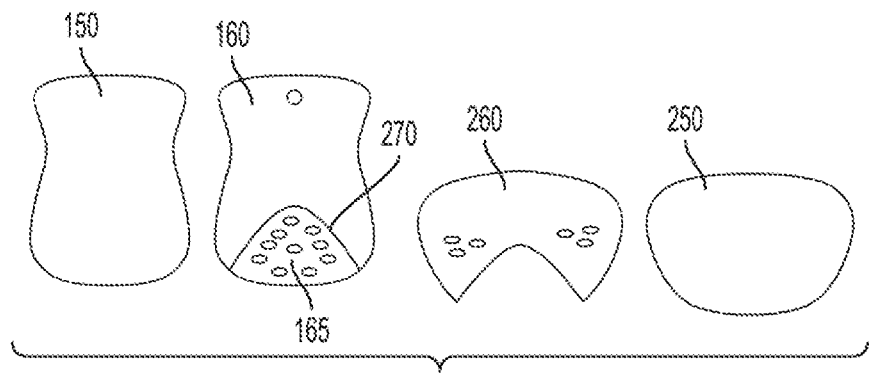
FIGS. 6-7 illustrate the panels of fabric used to manufacture an embodiment of the inflatable airbag cushion.
Figure 7:
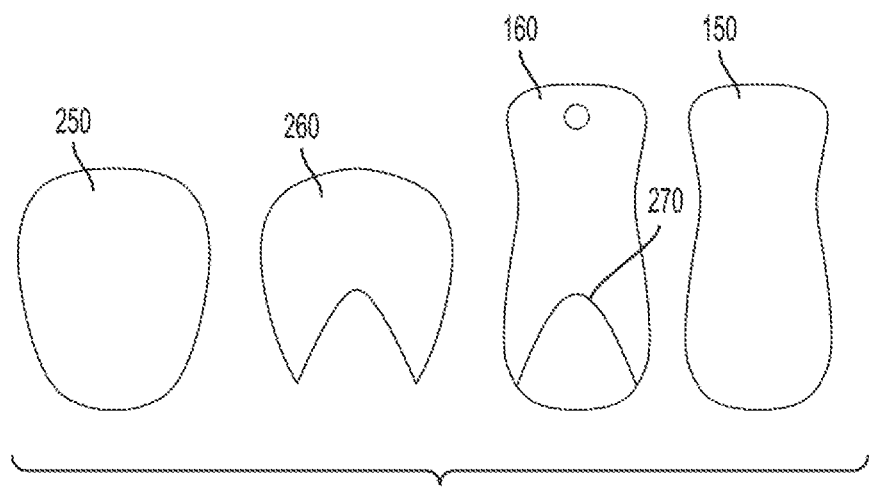

FIGS. 6-10 illustrate the panels of fabric used to manufacture the various embodiments of the inflatable cushion 400. As shown in FIGS. 6 and 7, four panels may be used to make the inflatable cushion 400.

The lower portion 100 is formed by a rear panel 150 and a front panel 160. The front panel 160 is closer to the front of the vehicle and includes an opening for the inflation gas to enter the airbag and also one or more openings 165 to allow gas to pass from the lower portion 100 to the upper portion 200. The upper portion 200 may be formed by a front panel 260 and a rear panel 250. Either panel may include vent openings that may be used to tune the performance of the airbag inflatable cushion 400.

As shown in FIG. 6, the vent openings may be located in the front panel 260 of the upper portion 200. A concave portion of the periphery of the front panel 260 of the upper portion 200 is connected to the front panel 160 of the lower portion along a seam line 270. The periphery of the panels are connected together (e.g., by sewing) to form the inflatable cushion 400.

Figure 8:
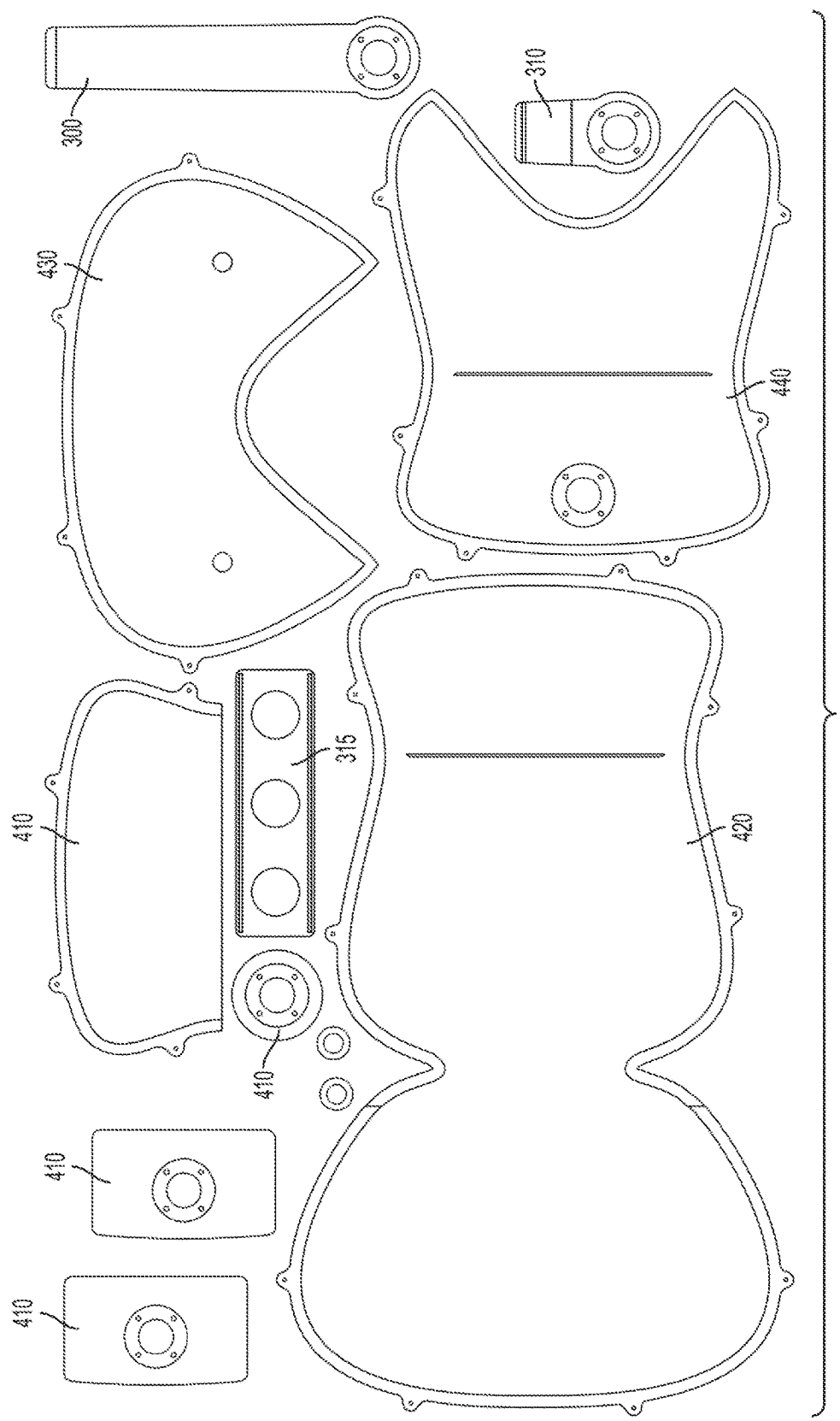
FIG. 8 illustrates the panels of fabric that may be used to manufacture another embodiment of the inflatable airbag cushion.

FIG. 8 shows the panels that may be used to manufacture an alternative embodiment of the inflatable cushion 400. FIG. 8 includes an additional panel 410 functioning as a heat shield. The heat shield 410 is located internally to the front panels 430, 440 and the rear panel 420 forming the lower portion of the inflatable cushion 400.

As shown in FIG. 8 a single rear panel 420 may be used for the entire inflatable cushion 400. Thus, instead of a four panel inflatable cushion 400, the inflatable cushion 400 may be formed by three main panels. The inflatable cushion 400 may also include one or more external tethers 300. As shown in FIG. 5, a tether 310 (e.g. a break tether) may be positioned near the inflator and direct the inflatable cushion 400 during the initial deployment. The tether 310 may be configured to break once the lower portion is inflated. A elongated external tether 300, also shown in FIG. 5, may extend between the lower portion 100 (e.g., at the inflator opening) and a perimeter of the upper portion 200 to provide for additional constriction of the inflatable cushion 400.

Figure 9:
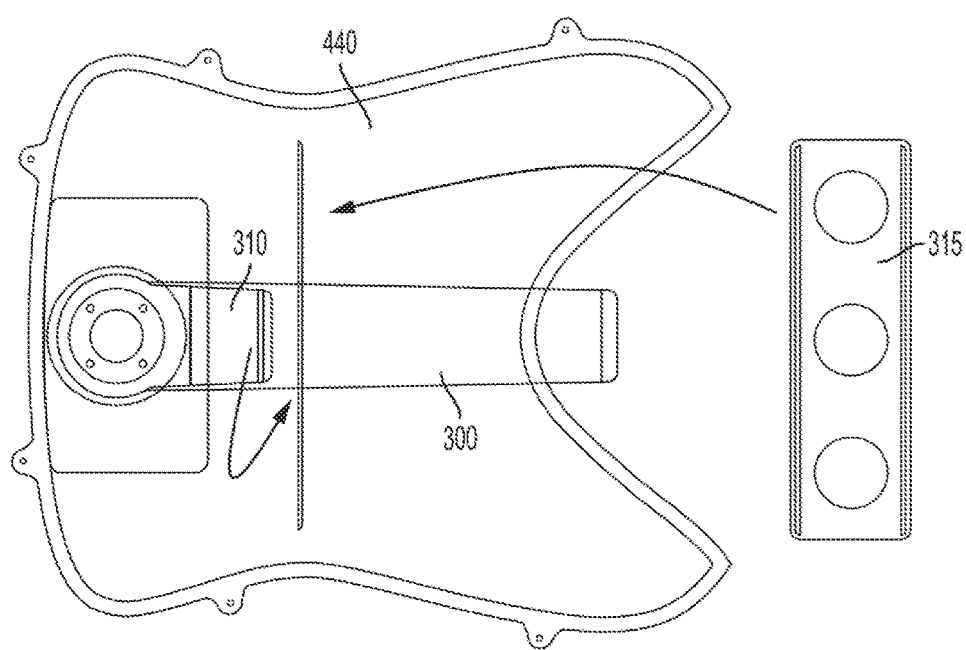
FIG. 9 illustrates a break tether of the inflatable airbag cushion.
Figure 10:
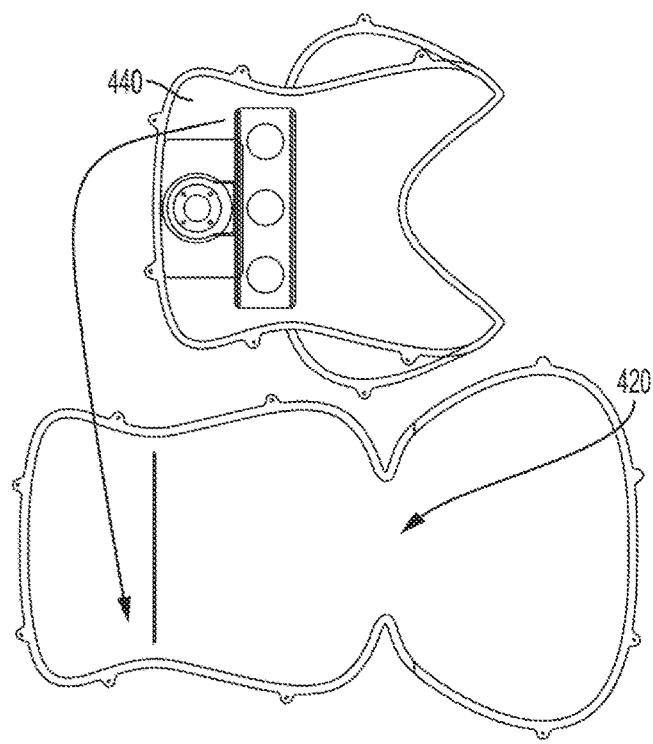
FIG. 10 illustrates a connection of an internal tether of the inflatable airbag cushion to a front panel of the inflatable airbag cushion.

An internal tether 315 may additionally function as a diffuser to distribute gas flow into the inflatable cushion 400. As shown in FIG. 8, the internal tether 315 includes three openings to evenly distribute gas into the lower portion 100. The internal tether 315 is connected between the front and rear panels along a seam line. For example, as shown in FIGS. 9 and 10, the internal tether 315 is sewn to the front panel 440 along a laterally extending seam. The external tethers 300 are connected to the opposite surface of the front panel 440. As shown in FIG. 9, one end of the tether 310 is also connected to the same seam as the internal tether 315 on the opposite surface of the front panel 440. FIG. 10 shows a connection of the internal tether 315 to the front panel 440. Also, the perimeters of the front panels 430, 440 are sewn together along the matching concave portion of their perimeter. After assembly of the internal tether 315 the perimeter of the rear panel 420 is sewn to the perimeter of the two front panels 430, 440.

Figure 11:
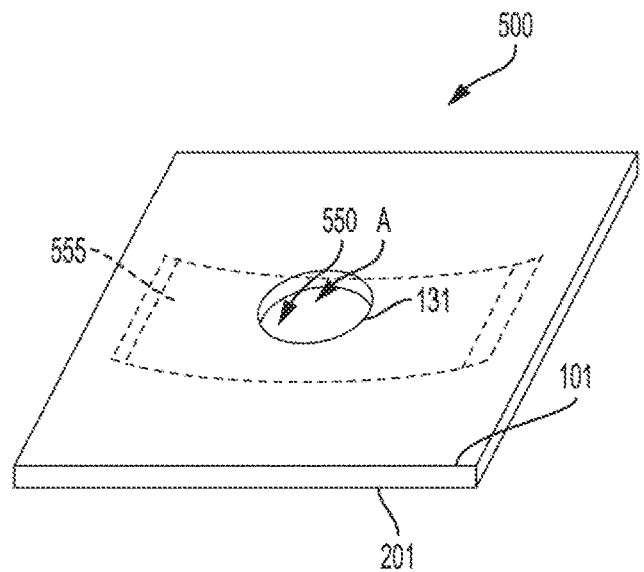
FIG. 11 illustrates a valve of the inflatable airbag cushion located in a passage of the inflatable airbag cushion.

As shown in FIG. 11, the inflatable cushion 400 may include a valve 500 located in the passage 550 between the lower portion 100 and the upper portion 200. The valve 500 may be configured as a check valve. For example, a main valve panel 101, 201 may be positioned in the passage 550 and connected to the front and rear panels of the inflatable cushion 400. The valve 500 may be configured to allow gas to flow in direction A from the lower portion 100 side of the valve 101 to the upper portion 200 side of the valve 201 through an opening 131. The opening 131 may be covered by an optional strip of fabric 555 to form a check valve.

When the inflatable cushion 400 inflates and is contacted by the occupant 40, pressure in the upper portion increases causing the valve strip 555 to block the opening 131. Flow is restricted from leaving the lower portion 100 thereby maintaining the pressure in the lower portion 100 for absorbing energy due to contact with the knees and pelvis of the occupant 40. The valve 500 may also be configured to allow restricted or limited backflow through the opening 131. For example, the size and shape of the strip 555 may be adjusted to permit an acceptable but reduced back flow through the opening 131.

Figure 12:
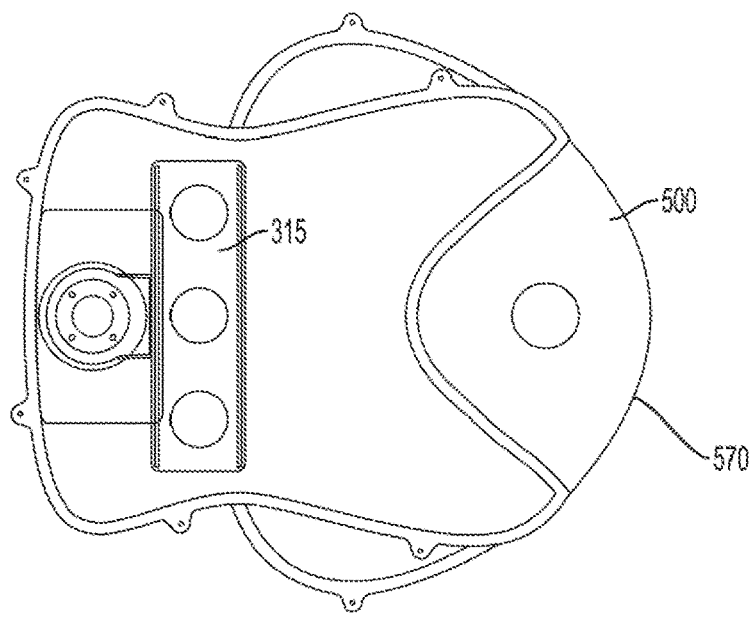
FIG. 12 illustrates the valve may be integrated into the panels of fabric used to manufacture the inflatable airbag cushion.

As shown in FIG. 12, the valve 500 may be integrated into the panels. For example, similar to the vent openings 165 shown in FIG. 6, the valve 500 may be incorporated into the lower portion front panel. Also, an upper outer edge 570 of the panel, which is positioned internally to the assembly inflatable cushion 400, may remain free from connection to the rear panel to allow for an adjustable amount of bypass gas flow between the lower portion 100 and the upper portion 200.

Figure 13:
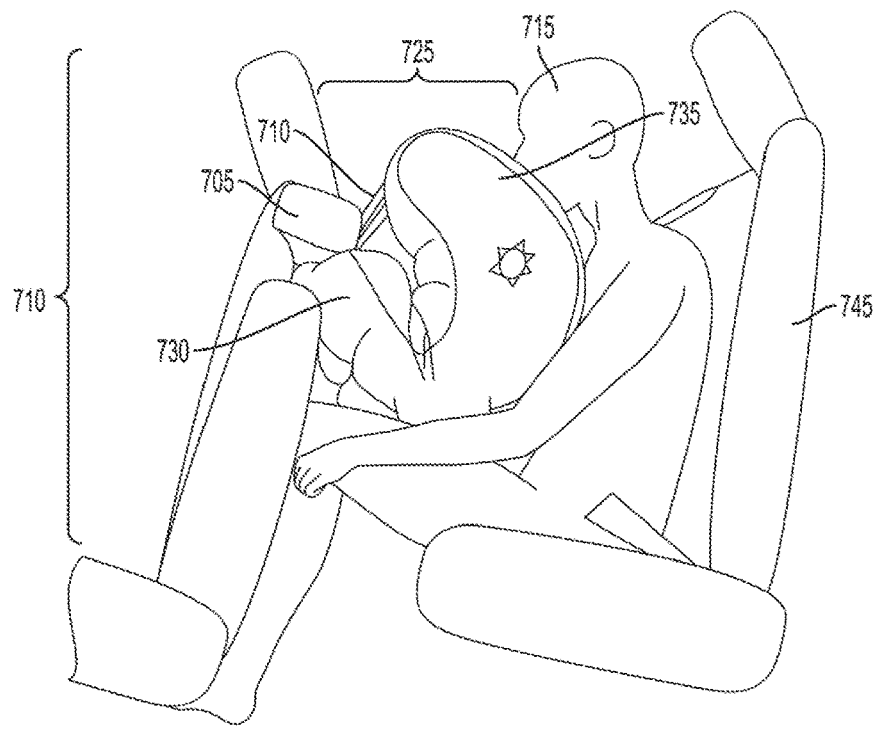
FIG. 13 is a side view of another embodiment of the rear seat airbag module.

FIG. 13 is a side view of another embodiment of the rear vehicle seat airbag module where the airbag module is configured to be mounted to an upper portion of a seatback 705 of a front vehicle seat 710 and when deployed provides the occupant 715 support and an energy absorbing function.

As shown in FIG. 13, the rear vehicle seat airbag module comprises an inflator 720 (not shown), an inflatable cushion 725 comprising a lower portion 730, an upper portion 735 and an external tether 740 connecting the lower portion 730 and the upper portion 735. The inflator 720 provides inflation gas to the inflatable cushion 725 and the inflatable cushion 725 is configured to deploy forward of the occupant 715 seated in the rear vehicle seat 745. During a frontal collision of the vehicle, the inflatable cushion 725 deploys and the occupant 715 loads the upper portion 735 and the lower portion 730 of the inflatable cushion 725 in a direction of the longitudinal axis of the vehicle.

The inflatable cushion 725 is configured to deploy forward of the occupant 715 seated in the rear vehicle seat 745 by curving away from the occupant 715. The inflatable cushion 725 deploys from a location above the knees of the occupant 715 and toward a pelvic region of the occupant 715. For example, the inflatable cushion may deploy from the upper portion of the seatback 705 of the front vehicle seat 710.

The external tether 740 is configured to control a trajectory of the deployment of the inflatable cushion 725 by restraining the upper portion 735 from deploying away from the lower portion 730. For example, the external tether 740 may control the trajectory of the deployment of the inflatable cushion 725 by restraining the upper portion 735 from moving away from the lower portion 730 such that the upper portion 735 folds back over the lower portion 730 as the upper portion 735 inflates. Accordingly, when the inflatable cushion 725 is inflated, the inflatable cushion 725 is configured in a curved shape such that the upper portion 735 is located above the lower portion 730.

As the lower portion 730 inflates the upper portion 735 begins to inflate as the inflation gas flows through the inflatable cushion 725. The upper portion 735 of the inflatable cushion 725 has a larger volume than the lower portion 730 of the inflatable cushion 725.

The inflatable cushion 725 may also further comprise a second external tether 750 (not shown) connected between an inflation point of the lower portion 730 and a point of the lower portion 730 proximate to the inflation point. The second external tether 750 may be short in length and is configured to control the trajectory of the deployment of the inflatable cushion 725 by restraining an outward projection of the inflatable cushion 725 and curving the deployment of the inflatable cushion 725. The second external tether 750 may also be configured to tear when subjected to a tensile force resulting from the deployment of the inflatable cushion 725.

Figure 14:
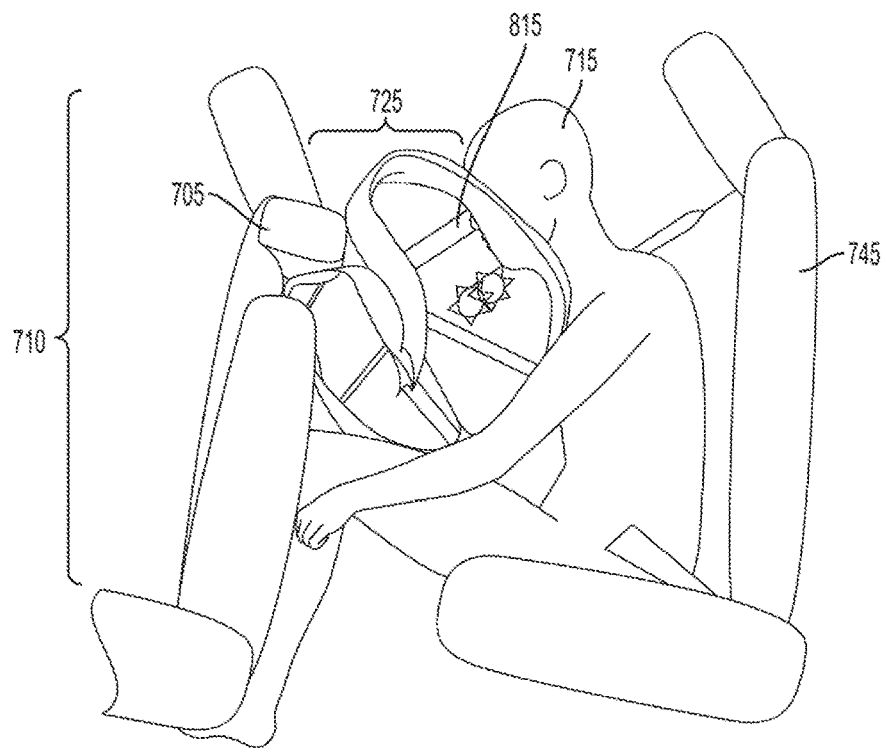
FIG. 14 is a side view of the another embodiment of the rear seat airbag module showing an interaction between the deployed inflatable airbag cushion and the occupant seated in the rear seat of the vehicle.

FIG. 14 is a side view of the another embodiment of the rear vehicle seat airbag module showing an interaction between the deployed inflatable cushion 725 and the occupant 715. During a frontal collision of the vehicle, the inflatable cushion 725 deploys forward of the occupant 715 and the occupant 715 loads the upper portion 735 and the lower portion 730 of the inflatable cushion 725 in a direction of the longitudinal axis of the vehicle.

As shown in FIG. 14, the inflatable cushion 725 further comprises at least one internal tether 815 having a plurality of diffuser openings 840. The internal tether 815 is offset and connects a front panel 800 and a rear panel 805 of the inflatable cushion 725. For example, the internal tether 815 is positioned at an angle between an inner surface of the front panel 800 and an inner surface of the rear panel 805 of the inflatable cushion 725.

The internal tether 815 is configured to control the trajectory of the inflatable cushion 725 by controlling a thickness of the inflatable cushion 725 during deployment. For example, the internal tether 815 controls the trajectory of the inflatable cushion 725 by reducing a thickness of the inflatable cushion 725 during deployment. The internal tether 815 is also configured to distribute the inflation gas through the plurality of diffuser openings 840 into the inflatable cushion 725 and partition the inflatable cushion 725 into at least a first inflatable portion and a second inflatable portion.

Figure 15:
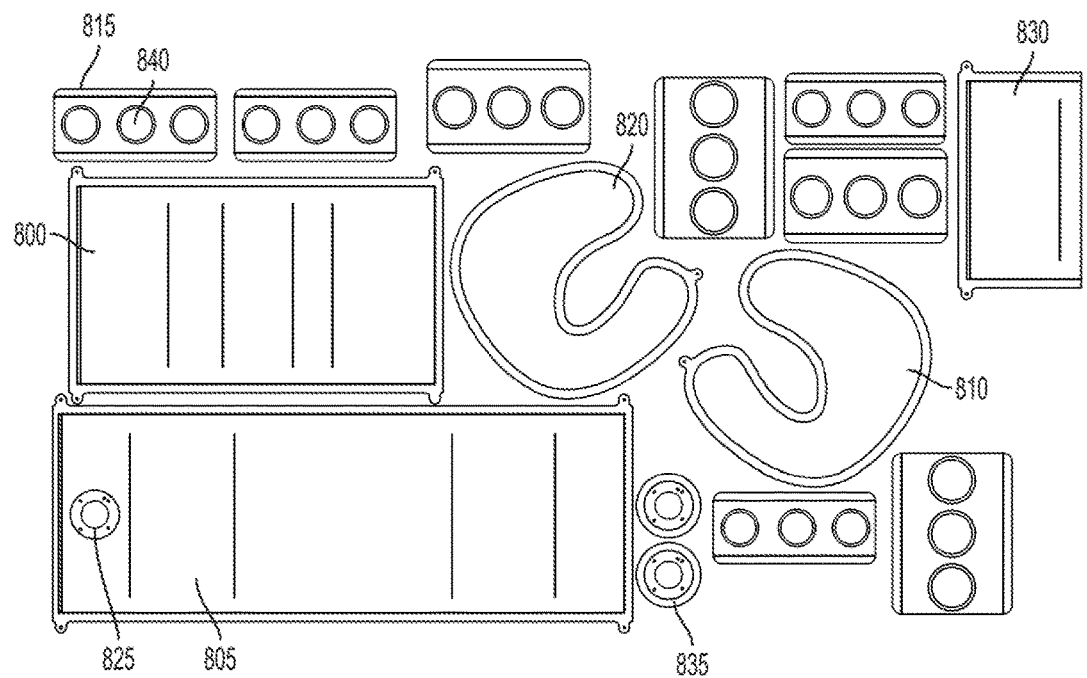
FIG. 15 illustrates the panels of fabric used to manufacture the another embodiment of the inflatable airbag cushion as shown in FIGS. 13 and 14.

FIG. 15 illustrates the panels of fabric used to manufacture the another embodiment of the airbag cushion as shown in FIGS. 13 and 14. The inflatable cushion 725 comprises a front panel 800, a rear panel 805, a first side panel 810, at least one internal tether 815, a second side panel 820, a heat shield 830 and at least one supporting reinforcement 835 for the inflator connection.

As shown in FIG. 15, the front panel 800 is closer to a front of the vehicle. The rear panel 805 is longer than the front panel 800, includes an opening 825 for the inflator and provides the inflatable cushion 725 with a curved back shape. The first side panel 810 and the second side panel 820 respectively have a curved shape. The heat shield 830 is located internally to the front panel 800 and the rear panel 805 of the lower portion 730 of the inflatable cushion 725.

Figure 16:
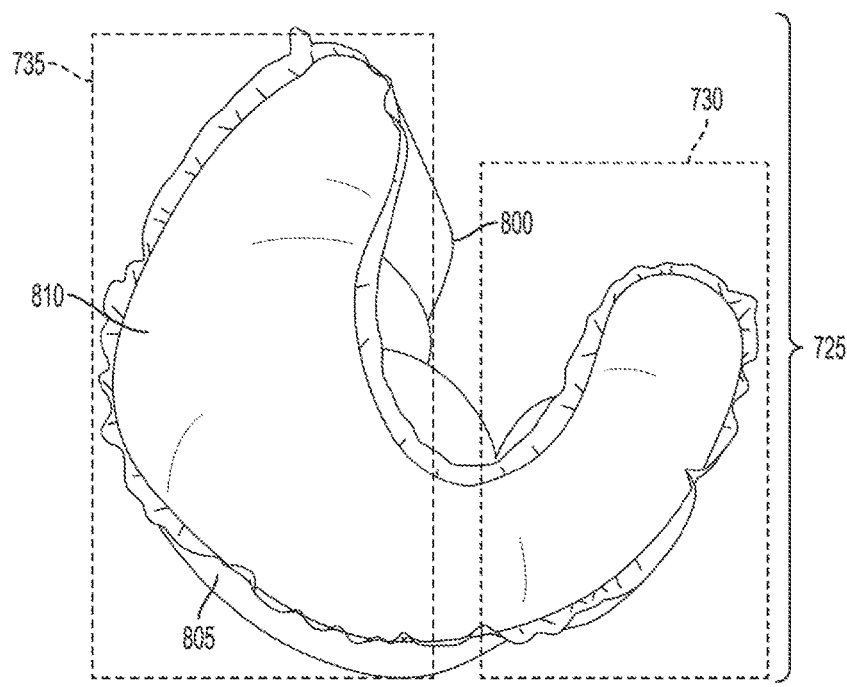
FIG. 16 illustrates a side view of the another embodiment of the inflated airbag cushion as shown in FIGS. 13 and 14.

FIG. 16 illustrates a side view of the another embodiment of the inflated airbag cushion 725 as shown in FIGS. 13 and 14. As shown in FIG. 16, the inflatable cushion 725 has a D-shaped geometry. Specifically, an edge of the first side panel 810 is connected to each of the front panel 800 and the rear panel 805 along a first continuous seam, and an edge of the second side panel 820 is connected to each of the front panel 800 and the rear panel 805 along a second continuous seam.

In addition to the respective shapes of the panels of fabric used to manufacture the another embodiment of the inflatable cushion 725, the D-shaped geometry of the inflatable cushion 725 is also configured by the external tether 740 (not shown). For example, the external tether connects the lower portion 730 and the upper portion 735 of the inflatable cushion 725 so that when the inflatable cushion 725 is inflated the inflatable cushion 725 has a curved shape such that the upper portion 735 is located above the lower portion 730.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to any precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "fore," "aft," "inboard," "outboard," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the airbag and shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed:

1. A rear vehicle seat airbag module configured to be mounted to a portion of a seat back of a front vehicle seat comprising:
    an inflator;
    an inflatable cushion comprising a lower portion, an upper portion and a first external tether connecting the lower portion and the upper portion, wherein
        the inflator provides inflation gas to the inflatable cushion,
        the inflatable cushion is configured to deploy forward of an occupant seated in a rear vehicle seat such that the occupant loads the upper portion and the lower portion of the inflatable cushion during a frontal collision of a vehicle, and
        the first external tether is configured to control a trajectory of deployment of the inflatable cushion by restraining the upper portion from deploying away from the lower portion so that when the cushion is inflated the cushion is configured in a curved shape wherein the upper portion is located above the lower portion, and
    a second external tether being connected between an inflation point of the lower portion and a point of the lower portion proximate to the inflation point, wherein the second external tether breaks once the lower portion is inflated.

2. The rear vehicle seat airbag module of claim 1, wherein the inflatable cushion is configured to deploy toward a pelvic region of the occupant.

3. The rear vehicle seat airbag module of claim 1, wherein the external tether is configured to control the trajectory of the deployment of the inflatable cushion by restraining the upper portion from moving away from the lower portion such that the upper portion folds back over the lower portion as the upper portion inflates.

4. The rear vehicle seat airbag module of claim 1, wherein the inflatable cushion further comprises a second external tether, the second tether being connected between an inflation point of the lower portion and a point of the lower portion proximate to the inflation point and configured to control the trajectory of the deployment of the inflatable cushion by restraining an outward projection of the inflatable cushion and curving the deployment of the inflatable cushion.

5. The rear vehicle seat airbag module of claim 1, wherein the inflatable cushion further comprises a passage located at an interface between the lower portion and the upper portion such that as the lower portion inflates the upper portion begins to inflate as the inflation gas flows through the passage, the passage being formed by panels of the inflatable cushion and capable of being closed by one of a valve and a flow restrictor device.

6. The rear vehicle seat airbag module of claim 1, wherein the upper portion of the inflatable cushion has a larger volume than the lower portion of the inflatable cushion.

7. The rear vehicle seat airbag module of claim 1, wherein the inflatable cushion has a D-shaped geometry such that during the frontal collision the inflatable cushion deploys forward of the occupant by curving away from the occupant, the D-shaped geometry of the inflatable cushion being configured by the first external tether connecting the lower portion and the upper portion of the inflatable cushion so that when the inflatable cushion is inflated the inflatable cushion has the curved shape such that the upper portion is located above the lower portion.

8. The rear vehicle seat airbag module of claim 1, wherein the inflatable cushion further comprises
    at least one internal tether having a plurality of diffuser openings and connecting a front panel and a rear panel of the inflatable cushion, the at least one internal tether being configured to
        control the trajectory of the inflatable cushion by controlling a thickness of the inflatable cushion during the deployment, and
        distribute the inflation gas through the plurality of diffuser openings into the inflatable cushion.

9. The rear vehicle seat airbag module of claim 8, wherein the at least one internal tether is positioned at an angle between an inner surface of the front panel and an inner surface of the rear panel of the inflatable cushion.

10. The rear vehicle seat airbag module of claim 8, wherein the at least one internal tether is configured to partition the inflatable cushion into at least a first inflatable portion and a second inflatable portion.

11. The rear vehicle seat airbag module of claim 1, wherein the inflatable cushion further comprises a front panel, a rear panel, a first side panel and a second side panel, wherein
the front panel is closer to a front of the vehicle,
the rear panel is longer than the front panel thereby providing the inflatable cushion with the curved shape, and
the first side panel and the second side panel respectively have curved shapes.

12. The rear vehicle seat airbag module of claim 11, wherein
an edge of the first side panel is connected to each of the front panel and the rear panel along a first continuous seam, and
an edge of the second side panel is connected to each of the front panel and the rear panel along a second continuous seam.

13. The rear vehicle seat airbag module of claim 11, wherein the lower portion of the inflatable cushion further comprises a heat shield panel located internally to the front panel and the rear panel of the inflatable cushion.

14. A rear vehicle seat airbag module comprising:
an inflator;
an inflatable cushion comprising a lower portion, an upper portion and a first external tether connecting the lower portion and the upper portion, wherein
the airbag module is configured to be mounted to a portion of a seat back of a front vehicle seat,
the inflator provides inflation gas to the inflatable cushion, and
the first external tether is configured to control a trajectory of deployment of the inflatable cushion by restraining the upper portion from deploying away from the lower portion to curve the inflatable cushion such that during a frontal collision the inflatable cushion deploys forward of the occupant by curving away from the occupant, and
a second external tether being connected between an inflation point of the lower portion and a point of the lower portion proximate to the inflation point, wherein the second external tether breaks once the lower portion is inflated.

15. The rear vehicle seat airbag module of claim 14, wherein the inflatable cushion further comprises at least one internal tether having a plurality of diffuser openings and connecting a front panel and a rear panel of the inflatable cushion, the at least one internal tether being configured to
control the trajectory of the inflatable cushion by controlling a thickness of the inflatable cushion during the deployment, and
distribute the inflation gas through the plurality of diffuser openings into the inflatable cushion.

16. The rear vehicle seat airbag module of claim 15, wherein the at least one internal tether is positioned at an angle between an inner surface of the front panel and an inner surface of the rear panel.

17. A rear seat airbag module comprising:
an inflatable cushion having a D-shaped geometry and comprising a lower portion and an upper portion,
an inflator that provides inflation gas to the inflatable cushion,
wherein the inflatable cushion, during a frontal collision, deploys forward of an occupant seated in a rear seat of a vehicle by curving away from the occupant,
a first external tether is configured to control a trajectory of deployment of the inflatable cushion by restraining the upper portion from deploying away from the lower portion so that when the cushion is inflated the cushion is configured in a curved shape wherein the upper portion is located above the lower portion, and
a second external tether being connected between an inflation point of the lower portion and a point of the lower portion proximate to the inflation point, wherein the second external tether breaks once the lower portion is inflated.

18. The rear seat airbag module of claim 17, wherein the D-shaped geometry of the inflatable cushion is configured by the first external tether that connects the lower portion and the upper portion of the inflatable cushion so that when the inflatable cushion is inflated the inflatable cushion is configured in the curved shape wherein the upper portion is located above the lower portion and the first external tether is perpendicular to the lower portion and the upper portion.

19. The rear vehicle seat airbag module of claim 17, wherein the inflatable cushion further comprises a front panel, a rear panel, a first side panel and a second side panel, wherein
the front panel is closer to a front of the vehicle,
the rear panel is longer than the front panel thereby providing the inflatable cushion with the curved shape, and
the first side panel and the second side panel respectively have curved shapes.

* * * * *